Figure 1:
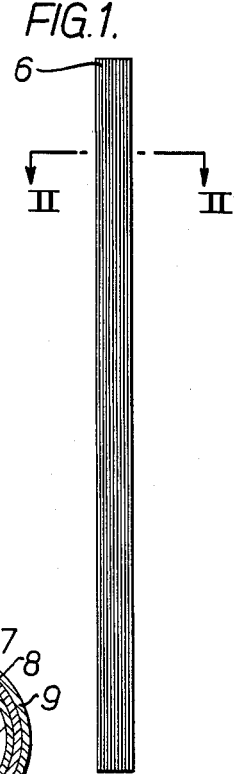

United States Patent Office 3,262,858
Patented July 26, 1966

3,262,858
NUCLEAR REACTOR FUEL ELEMENTS
John Henry Gittus, Wrea Green, near Preston, Lancashire, England, assignor to United Kingdom Atomic Energy Authority, London, England
Filed May 31, 1963, Ser. No. 284,400
Claims priority, application Great Britain, June 5, 1962, 21,787/62
2 Claims. (Cl. 176—73)

This invention relates to fuel elements for nuclear reactors.

Fuel for nuclear reactors usually comprises a nuclear fuel material such as metallic uranium, plutonium or their alloys or compounds, or mixtures thereof, surrounded by a can or cladding which contains the undesirable substances produced during fission and prevents chemical inter-action of the fuel and the coolant.

Because heat is generated throughout the nuclear fuel members and can only be removed at the outer surface of the cladding, a temperature gradient is set up in the fuel during its period of use in the reactor. Thus the centre of the fuel must always be at a considerably higher temperature than the surface of the cladding, if this were not the case heat would not flow out of the centre of the fuel.

To achieve the maximum efficiency from a power plant, producing electricity, the working substance must be heated to the highest possible temperature. If the heat is provided by a nuclear reactor, then the coolant in that reactor must be heated to the highest possible temperature and hence the surface of the cladding must be as hot as possible. In practice, providing that the cladding material is adequate, the limitation is set by the maximum admissible central temperature of the fuel which may, for example, be the temperature at which large amounts of the fission product gases xenon and krypton are released from the hot fuel, causing dangerously high gas pressures which can rupture the fuel element or impair its efficiency in a number of other ways. Thus if the maximum permissible fuel temperature is $T°$ C., then the temperature of cladding will be $(T-\Delta T)°$ C. where $\Delta T°$ C. is the fall in temperature from the centre of the fuel to the surface of the cladding. Clearly, the smaller $\Delta T$, the more efficient the power station.

According to the present invention a fuel element for a nuclear reactor comprises a bundle of filaments of nuclear fuel material extending the full length of the fuel element, the filaments being coated with cladding material and being sintered together in the bundle along the the lines of contact of the cladding material on the fuel elements, pores separate from one another and extending along the length of the fuel element being defined between the filaments so that in use of the fuel element in a nuclear reactor, coolant can pass through the pores in the fuel element as well as over its outer surface. The porosity preferably comprises between 10% and 50% of the volume of the fuel element.

Figure 2:
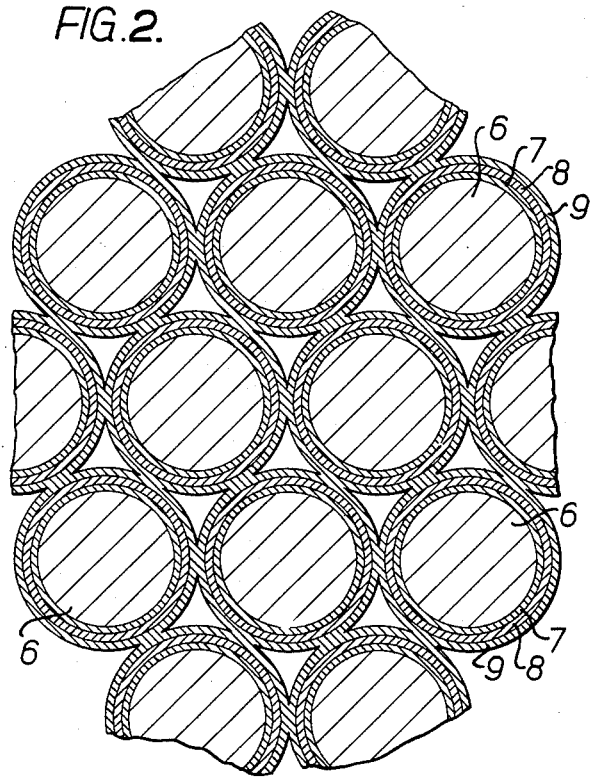

One embodiment of the invention will now be described by way of example with reference to the accompanying drawings in which:

FIGURE 1 is an elevation of one form of nuclear reactor fuel element in accordance with the invention, FIGURE 2 is a detail in enlarged cross section along the line II—II in FIGURE 1.

The fuel element shown in FIGURES 1 and 2 comprises a bundle of wires 6 of 1 millimetre diameter produced by extruding and drawing an alloy of uranium containing 14 wt. percent of molybdenum. The wires 6 are cold drawn to make them straight and hard and are then heated in nickel carbonyl gas to produce a nickel coating 7 about 0.04 mm. thick. The coated wires 6 are next heated in molybdenum carbonyl gas to produce a coating 8 of molybdenum 0.06 mm. thick. They are then coated with the organic substance known as "Araldite" (registered trade mark) and rolled in powdered stainless steel. They are then heated to decompose the "Araldite" and sinter the stainless steel powder, producing a top coat 9 of stainless steel 0.06 mm. thick. If the reactor is cooled by a gas such as carbon dioxide or steam, the wires 6 are bundled together to form a fuel element of the shape shown in FIGURE 1 and heated under pressure to sinter them together at their points of contact (as shown in FIGURE 2).

I claim:

1. A nuclear reactor fuel element comprising a bundle of filaments of nuclear fuel material extending the full length of the fuel element, the filaments being coated with cladding material and being sintered together in the bundle along the lines of contact of the cladding material on the fuel elements, the composite structure containing 10–50 volume percent of porosity in the form of pores defined between the filaments, separate from one another, and extending along the length of the fuel element, so that in use of the fuel element in a nuclear reactor, coolant can pass through the pores in the fuel element as well as over its outer surface.

2. A nuclear reactor fuel element as claimed in claim 1 wherein the filaments are of an alloy of uranium containing 14 weight percent of molybdenum and are coated with a layer of nickel followed by a layer of molybdenum and finally a layer of stainless steel.

References Cited by the Examiner

UNITED STATES PATENTS

| 2,042,635 | 6/1936 | Schellens | 75—222 X |
| 2,894,891 | 7/1959 | Grebe | 176—42 |
| 2,920,025 | 1/1960 | Anderson | 176—90 |
| 2,938,848 | 5/1960 | Ladd et al. | 176—78 X |

FOREIGN PATENTS

| 1,041,177 | 10/1958 | Germany. |
| 845,804 | 8/1960 | Great Britain. |
| 859,494 | 1/1961 | Great Britain. |

OTHER REFERENCES

"Fuel Element Fabrication," volume 2, Proceedings of a Symposium held in Vienna, May 10–13, 1960, Academic Press, New York, 1961, pp. 253–266.

L. DEWAYNE RUTLEDGE, *Primary Examiner.*

REUBEN EPSTEIN, CARL D. QUARFORTH,
*Examiners.*

R. L. GRUDZIECKI, M. J. SCOLNICK,
*Assistant Examiners.*